United States Patent
Moon et al.

[11] Patent Number: 6,104,384
[45] Date of Patent: Aug. 15, 2000

[54] IMAGE BASED KEYBOARD FOR A SMALL COMPUTING DEVICE

[75] Inventors: Billy G. Moon, Apex; Tripurasundari Ramesh, Cary, both of N.C.

[73] Assignee: Ericsson, Inc., Research Triangle Park, N.C.

[21] Appl. No.: 08/928,801

[22] Filed: Sep. 12, 1997

[51] Int. Cl.[7] ...................................................... G09G 5/00
[52] U.S. Cl. .......................... 345/168; 345/354; 345/173; 345/131; 345/133
[58] Field of Search ...................................... 345/354, 168, 345/173, 127, 131, 133, 333, 348; 341/22

[56] References Cited

U.S. PATENT DOCUMENTS

| | | | |
|---|---|---|---|
| 3,792,466 | 2/1974 | Arnold et al. | 340/365 E |
| 4,587,520 | 5/1986 | Astle | 345/160 |
| 4,706,068 | 11/1987 | Eberhard | 340/365 S |
| 5,623,261 | 4/1997 | Rose | 341/26 |
| 5,627,567 | 5/1997 | Davidson . | |
| 5,748,177 | 5/1998 | Baker et al. | 345/133 |
| 5,812,117 | 9/1998 | Moon | 345/169 |
| 5,818,451 | 10/1998 | Bertram et al. | 345/354 |

FOREIGN PATENT DOCUMENTS

| | | |
|---|---|---|
| 0 422 577 A2 | 4/1991 | European Pat. Off. . |
| 03232009 | 10/1991 | Japan . |
| 07295748 | 11/1995 | Japan . |

OTHER PUBLICATIONS

"Dynamically Allocatable Key Tables for a Touch Screen Controller", Research Disclosure, No. 299, Mar. 1, 1989, p. 207.

"Algorithm for Decreasing the Error Rate of Data Entered on a Touch–Sensitive Terminal", IBM Technical Disclosure Bulletin, vol. 33, No. 10A, Mar. 1, 1991, pp. 223–227.

*Primary Examiner*—William A. Cuchlinski, Jr.
*Assistant Examiner*—Marthe Y. Marc-Coleman
*Attorney, Agent, or Firm*—Coats & Bennett, PLLC

[57] ABSTRACT

A virtual keyboard displayed on a computer display is used to emulate a conventional keyboard. The coordinate position of the keys on the virtual keyboard are stored as an array in the computer's memory. The key coordinates are ordered in the array based on their frequency of occurrence. A pointing device is used to select keys on the virtual keyboard. The input points generated by the pointing device are compared to the key coordinates stored in the key coordinate array one at a time. A predetermined bounding criteria is applied to determine whether the input point matches that key. If so, then the key is assigned to the input point and the search is discontinued. The search for a matching key continues until a match is found or until the end of the array is reached.

13 Claims, 4 Drawing Sheets

IMAGE BASED KEYBOARD FOR A SMALL COMPUTING DEVICE

FIELD OF THE INVENTION

The present invention relates generally to input devices for a computing device, and more particularly, to a method for inputting data to a computing device using a virtual keyboard displayed on an electronic display.

BACKGROUND OF THE INVENTION

In a typical computer system, a keyboard and/or pointing device (such as a mouse) is used to enter data and commands into the computer. A monitor is used to display information to the user. In a desktop system, the keyboard and display are discrete components which are connected to the computer by means of a cable. In a laptop computer, the keyboard and display are designed as integral components of the computer case. In recent years, there has been interest in incorporating computers into small electronic devices such as cellular phones.

While electronic display technology has advanced to the point that small display screens are readily commercially available, there are practical limits when it comes to reducing the size of a keyboard. In small electronic devices, there may be insufficient space to incorporate a complete 101-key keypad as is found in a conventional desktop computer.

One solution to this problem is to display an image of a conventional 101-key keyboard on a computer display. The user can select or "press" keys by means of a pointing device such as a mouse, track ball, light pen, or touch screen. The computer uses a coordinate system to map the input points to specific keys on the keyboard. In general, the computer maps the input points to the nearest key character which may span a few pixels in height and width. Mapping input points to the nearest key coordinate means that the distance to all keys must be found before a decision can be made about which key is closest to the input point. Computing the distance between input points and each of the keys each time a key is selected requires a large number of calculations to be performed. Thus, processor time is devoted to mapping the input points to individual keys which could be spent performing other tasks.

SUMMARY OF THE INVENTION

The present invention provides an improved method for mapping input points generated by a pointing device to individual keys of an on-screen keyboard. A keyboard is displayed to the user on an electronic display. The user selects one of the keys using a pointing device such as a mouse, or light pen. Key coordinates for each key are stored in a key coordinate array. The key coordinates are ordered based on some frequency criteria. That is, keys with higher probability of occurrence are placed in the key coordinate array before keys with a lower probability of occurrence. When a key is selected by the user, the computer compares the coordinates of the input point with the key coordinates stored in the key coordinate array beginning with the first array element (which has the highest frequency of occurrence) and continuing until a match is found. A bound check is performed to determine whether the input point matches any one of the keys in the array. For each array element the computer compares the coordinates of the input point to the key coordinates stored in the array. If the comparison meets some pre-defined condition, then a match is declared and the corresponding key is mapped to the input. Otherwise, the bound check is performed for the next key in the key coordinate array. This process is repeated until a matching key is found, or until the end of the key coordinate array is reached in which case no mapping is performed.

The present invention has several advantages over the methods used in the past. First, the use of the confidence intervals or bounds allows the key mapping search to be discontinued once a match is found. This greatly reduces the time needed to perform the key mapping search. Further reduction in search time is obtained by ordering the keys in the array based on frequency of occurrence. By doing so, it takes less time to match the input points to those keys used most frequently, and more time to keys used less frequently. The net result is a savings in search time.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

DERAILED DESCRIPTION OF THE INVENTION

Figure 1:
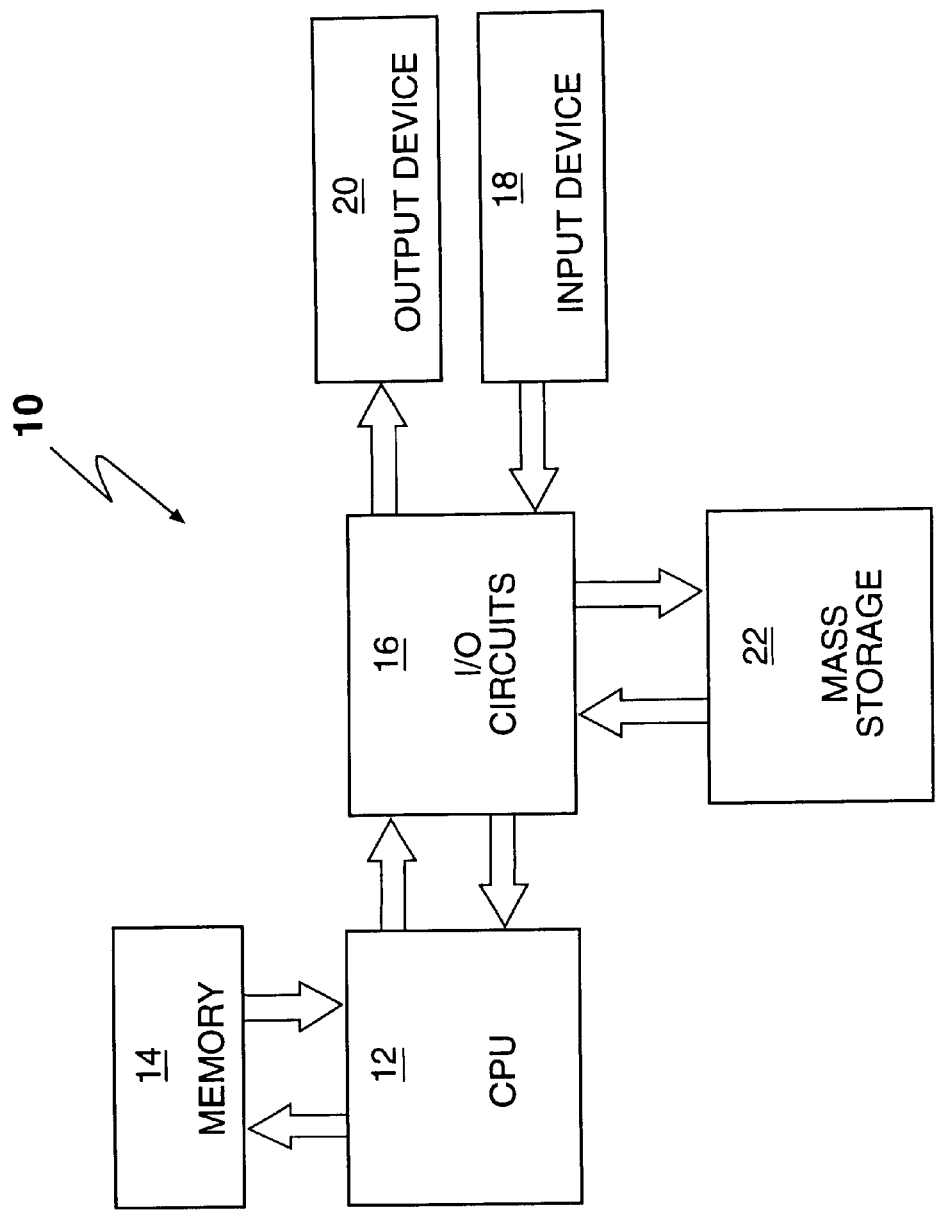
FIG. 1 is a schematic block diagram illustrating the main components of a computer system which uses the virtual keyboard interface.

Referring now to the drawings, a schematic block diagram illustrating the main components of a computer system is shown. The computer system includes a central processing unit (CPU) which operates according to instructions stored in its memory 14. An input/output (IO) circuits 16 interfaces the CPU 12 with one or more input devices 18 such as a keyboard and/or pointing device and a display 20. Other output devices may also be connected to the CPU 12 via the I/O circuits 16. The computer may also include a mass storage device 22 such as a hard disk drive, floppy disk drive, or optical disk drive.

Figure 2:
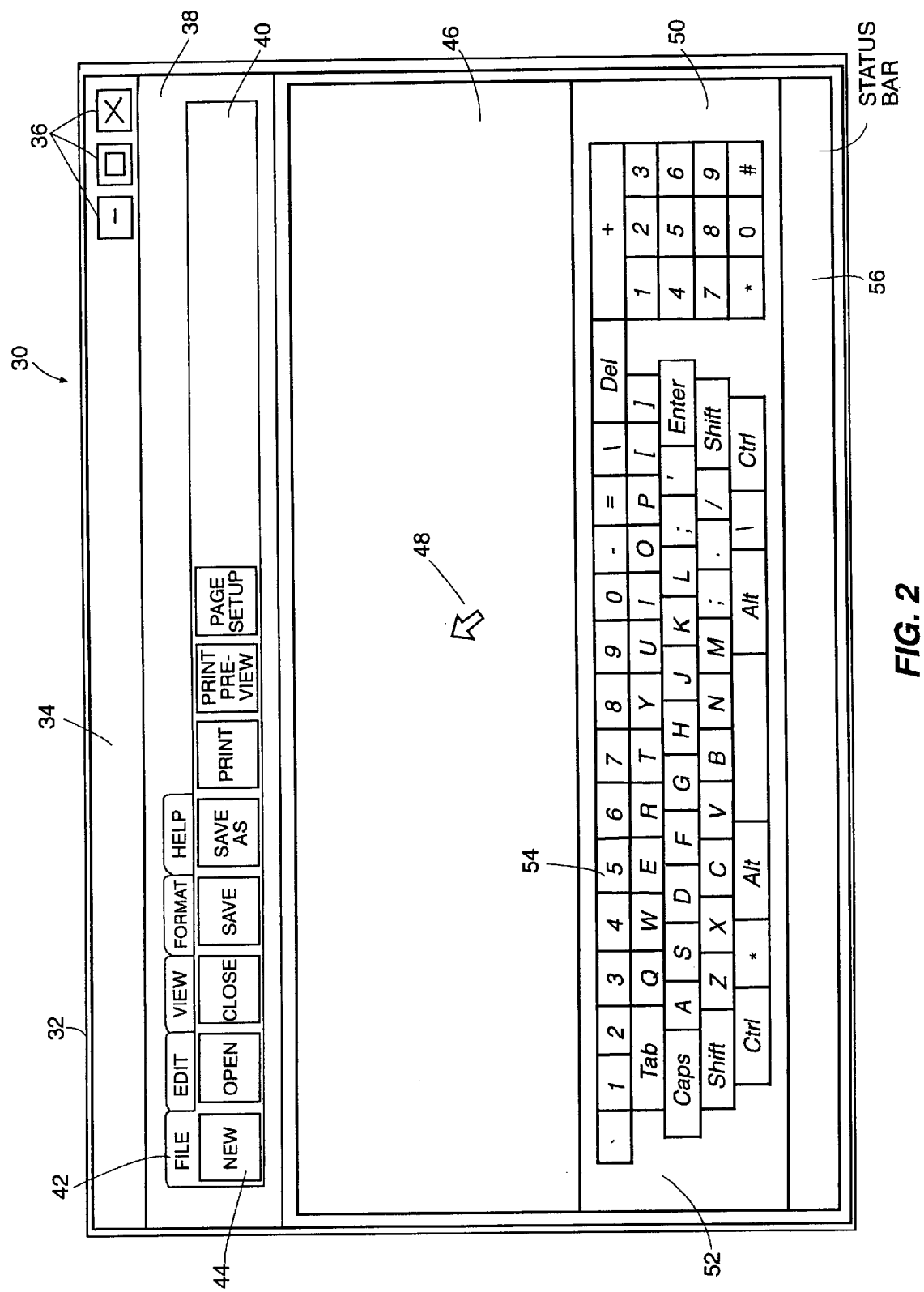
FIG. 2 is an illustration of a graphical user interface which implements the virtual keyboard.

In the present invention, it is contemplated that the input device 18 will comprise a pointing device such as a mouse which is used to move a cursor 48 within a graphical user interface (GUI) 30 displayed to the user on the display 20 (see FIG. 2). The mouse, generates a position change signal in response to movement which is passed to the CPU 12. The position change signals are processed by the CPU 12 to cause a corresponding update of the position of a cursor 48 on the display 20 of the computer system 10. The CPU 12 keeps track of the position of the cursor 48. The mouse also includes buttons which can be pressed by the user. When the button is pressed down, a signal is generated and passed to the CPU 12. Similarly, another signal is sent by the mouse to the CPU 12 when the button is released. Pressing and releasing the button once is referred to as "clicking". Pressing and releasing the mouse button twice is referred to as "double clicking". When the mouse is "clicked", the CPU 12 determines the coordinate position of the cursor and assigns some meaning to the input based upon the coordinate position of the cursor 48.

A mouse or pointing device is most frequently used in a graphical user interface (GUI) to enter commands. For example, the mouse may be used to select menu items by positioning the cursor over the menu item and "clicking" with the mouse. Programs can be launched using the mouse by positioning the cursor over an icon (which represents the program) and "double clicking" with the mouse. In the past, the mouse or pointing device has not been commonly used to enter alphanumeric characters.

Although the embodiment described herein employs a conventional mouse, it will be appreciated that other types of pointing devices may also be used such as a trackball, digitizer tablet, light pen, or touch screen. All of these devices are used to point to images displayed on the display 20 and generate an input which is converted by the computer to a coordinate. The computer assigns meaning to the input based upon the coordinate position of the input point.

Referring now to FIG. 2, a graphical user interface 30 of a user application running on the computer system 10 is shown. The user application illustrated in FIG. 2 is a word processing application. It is to be understood, however, that the present invention can be used with virtually any type of user application and is not limited to word processing applications. The GUI 30 differs from conventional GUI's in that it provides for entry of alphanumeric characters or other keyboard commands (such as function keys) by means of a mouse or other pointing device. The GUI 30 is displayed to the user on the screen of the computer display 20.

The GUI 30 comprises a window 32 having a title bar 34 across the top of the window 32. Title bar buttons 36 are disposed on the right hand of the title bar 34. These buttons 36 are used to close, maximize and minimize the window 32. Buttons 36 are activated using the "point and click" method. These buttons will be familiar to users of the Windows 95 and Windows NT operating systems. A status bar 56 where messages or icons are displayed for the user extends across the bottom of the window.

Below the title bar 34 is the menu bar 38. The menu bar 38 includes a tab strip 40 with a series of tabs 42. Menu buttons 44 are placed on the tab strip 40. Different sets of menu buttons 44 can be selected by "clicking" on the tabs 42 with the mouse. Menu buttons 44 are also selected by "clicking" the menu button 44 with the mouse.

The area below the menu bar 38 is the work area 46 where the object being manipulated by a user application is displayed to the user. The cursor 48, which is moved by the mouse, is shown in the work area 46.

Below the work area 46 is the keyboard panel 50 in which the image 52 of a keyboard is displayed. This virtual keyboard 52 is used in combination with the mouse or other pointing device to emulate the operation of a conventional keyboard. To use the virtual keyboard 52, the cursor 48 is positioned over one of the keys 54 (i.e., pointed at the key) of the virtual keyboard 52 and the mouse is "clicked". When a mouse click occurs within the boundary of the virtual keyboard 52, the CPU 12 or other logic controller must determine which key was selected. The CPU 12 then determines what action to take based upon the key which was selected. The process of assigning a key to the mouse click is referred to as mapping.

There are numerous ways in which to map the keys 54 of the virtual keyboard 52 to a mouse click point within the area of the virtual keyboard 52. Perhaps the simplest method is to store the coordinate position corresponding to the center point for each key 54 in a key coordinate array and then calculate the distance between the mouse click point and each key 54 in the key coordinate array. The key closest to the mouse click point would then be the selected key 54. For a 101-key keyboard, this method would require 101 separate calculations before a decision could be made.

The present invention provides an improved method for mapping the keys 54 of the virtual keyboard 52 to a mouse click or user input. To implement this method, the key coordinates for the keys 54 in the virtual keyboard 52 are stored in a key coordinate array in memory 14. The keys are ordered in the key coordinate array based on some frequency criteria. That is, coordinates of keys 54 with higher probability of occurrence are present before keys 54 with lower probability of occurrence. When a mouse click occurs, the mouse click coordinates are compared to the key coordinates stored in the key coordinate array beginning with the first element of the array and continuing until a match is found. For each element of the key coordinate array, a bound check is performed to determine whether the mouse click coordinate matches that key 54. If the bound check criteria is satisfied, then the corresponding key 54 is mapped to the mouse click and the search is stopped. If the bound check criteria is not satisfied, then the bound check is performed for the next key 54. This process continues until a matching key 54 is found or until the end of the array is reached in which case no mapping will occur.

As stated above, the CPU 12 performs a bound check to determine whether a given key 54 maps to a mouse click or other user input. In general, the CPU 12 determines whether the x and y coordinate of the input point (i.e., mouse click point, pen point, touch point, etc.) fall within a certain range, called the confidence interval, of the key coordinate. For example, assume that each letter key 54 in the virtual keyboard 52 has a width $W_x$ and a height $W_y$. The confidence intervals may be chosen to be half the width and height of the letter key. That is, $W_x/2$ and $W_y/2$ are the confidence intervals. Let $P_k(X_k, Y_k)$ represent any key coordinate in the key coordinate array and P(X, Y) represent the input point on the virtual keyboard 52. The bound check for a valid key mapping is calculated as follows:

$$|X-X_k| \leq W_x/2 \text{ and}$$

$$|Y-Y_k| \leq W_y/2$$

If the bound check criteria set forth above is satisfied, then the key with the midpoint $P_k(X_k, Y_k)$ is mapped to the input point. On the other hand, the bound check criteria is not satisfied under the following conditions:

$$|X-X_k| > W_x/2 \text{ or}$$

$$|Y-Y_k| > W_y/2$$

In this case, the key is not mapped to the mouse click point. When the bound check criteria is not satisfied, the CPU 12 moves to the next key coordinate in the key coordinate array and repeats the bound check.

Figure 3:
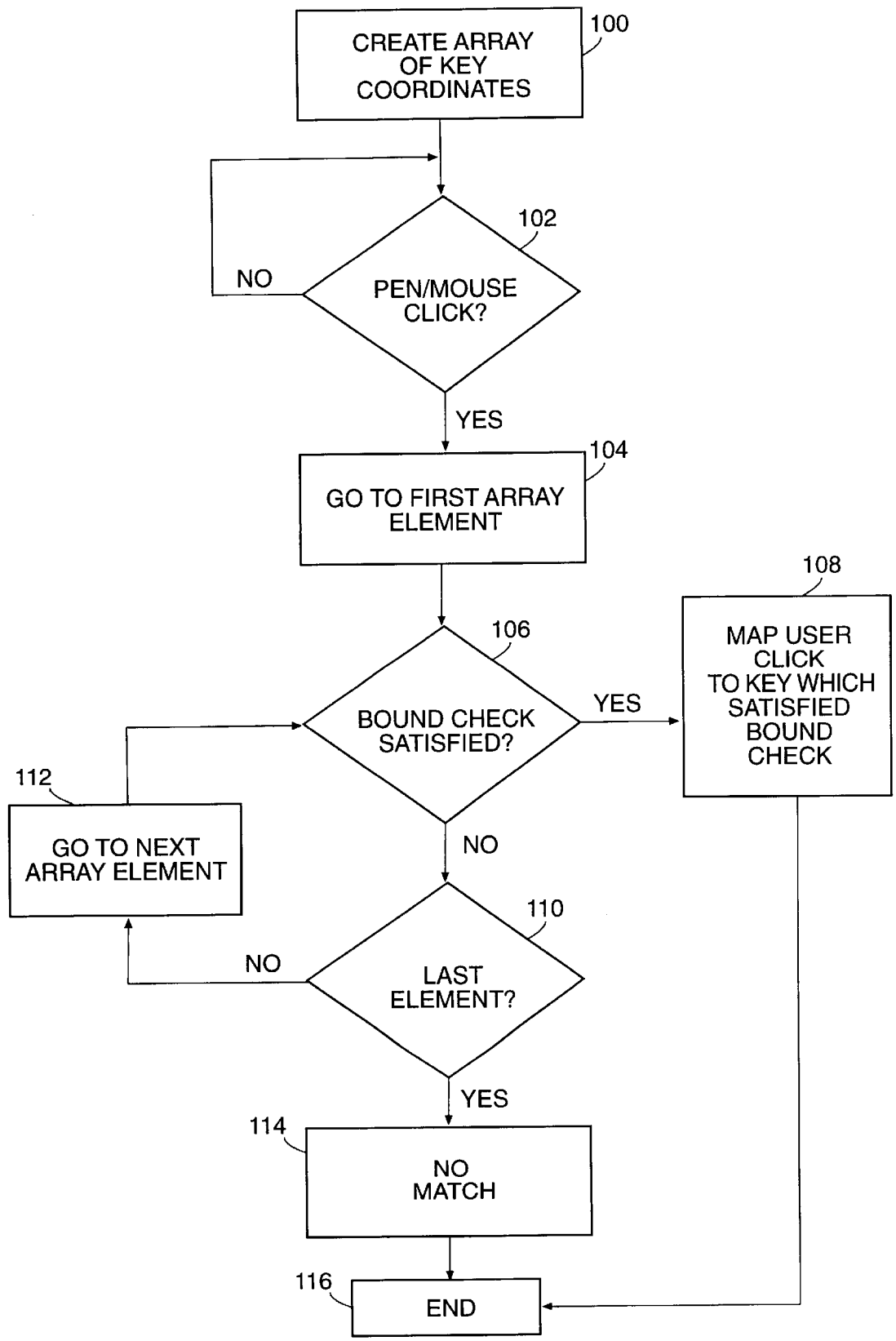
FIG. 3 is a flow diagram illustrating the key mapping method of the present invention.

FIG. 3 is a flow chart illustrating the key mapping algorithm of the present invention. The first step is to create an array of key coordinates (block 100). This array is referred to herein as the key coordinate array. The CPU 12 performs other tasks until user input, such as a mouse click, is detected (block 102). Once the user input is detected, the CPU 12 goes to the first element in the key coordinate array (block 104). Using the key coordinates in the first element of the key coordinate array, the CPU 12 performs a bound check (block 106). If the bound check is satisfied, the corresponding key is mapped to the mouse click (block 108) and stops the key mapping search (block 116). On the other hand, if the bound check criteria is not satisfied, the CPU 12 determines whether it is on the last element of the key coordinate array (block 110). If not, the CPU 12 goes to the next element in the key coordinate array (block 112) and repeats the bound check (block 106). This process repeats until a matching key is found, or until the last element in the key coordinate array is reached. When the last element of the key coordinate array is reached without a match, then no mapping is performed (block 114) and the key mapping search is stopped (block 116).

The confidence intervals used to perform the bound checks are based on the key shapes and sizes. As can be seen in FIG. 2, all of the keys 54 are of equal height but vary in width. The confidence intervals given above are based on the dimensions of the letter keys 54 which have the smallest width. The result is that those keys 54 wider than the letter keys 54 will have dead zones adjacent the outer ends thereof. This may prove frustrating to some users who "click" with the pointing device but do not get any corresponding response. In the preferred embodiment of the invention, this problem is solved by assigning widths to all keys 54 which are integer multiples of the letter keys. For example, the ENTER key is twice the width of the letter keys and the space bar is three times the width of the letter key. Keys 54 which are twice the width of the letter keys will have two center points both of which are stored in the key coordinate array. Similarly, keys 54 which are three times as wide as the letter keys will have three center points which are, again, stored in the key coordinate array. Thus some keys 54 will be represented multiple times in the key coordinate array. In keys 54 with multiple center points, the distance between the center points is equal to the width of the letter keys. This arrangement eliminates the dead zones in the keys 54 which are wider than the letter keys.

Another problem which may be encountered is when the user "clicks" on the boundary between two keys 54. Both keys 54 will satisfy the bound check criteria. In this case, the CPU 12 will assign the key 54 to the input which is appears first in the key coordinate array. This key 54 may not be the one which was intended by the user. It is reasonable to assume that this situation will occur infrequently since most key selections will occur near the center of the keys 54. When it does occur, the key 54 with the highest probability of occurrence will be selected thus minimizing the chance of an error. When an error is made, the user is likely to view the error as a typing mistake.

Figure 4:
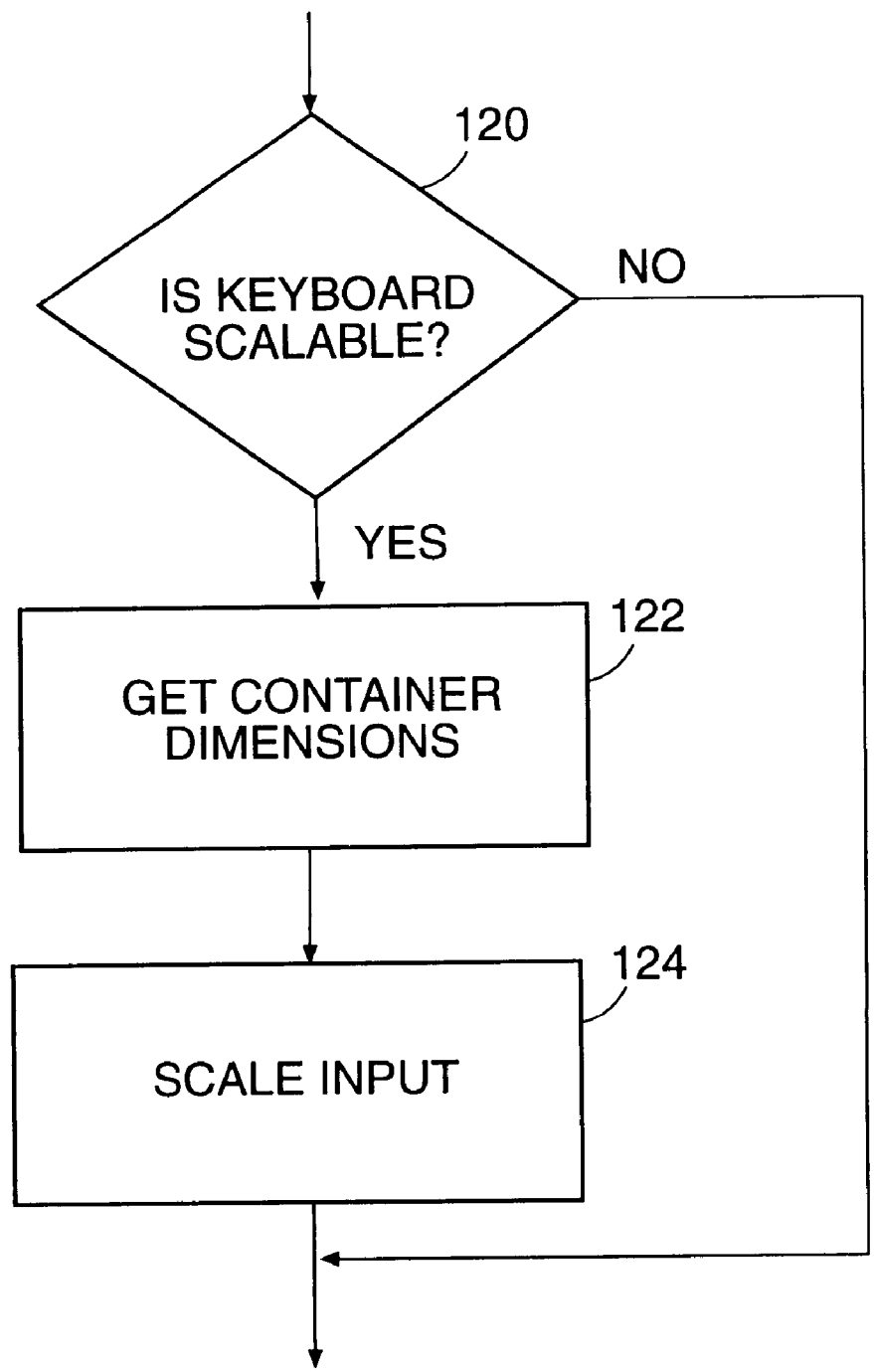
FIG. 4 is a flow diagram illustrating the scaling step of the key mapping method.

In some cases, the virtual keyboard 52 may be contained in a scalable window 32 or other container. When the window 32 or container is resized, the virtual keyboard 52 is scaled to fit into the resized window 32. Thus, an additional scaling step is needed before a bound check can be performed. In the preferred embodiment, the key coordinates stored in the key coordinate array are for a standard keyboard image which corresponds to a prefixed container dimension. When a mouse click occurs, the mouse click point is scaled from the container dimension for the resized keyboard container to the prefixed keyboard container dimension before the bound check is performed. FIG. 4 illustrates this scaling algorithm. At block 120, the CPU 12 determines whether the keyboard is scalable. If so, the CPU 12 obtains the keyboard container dimensions using a function call to the operating system (block 122). After obtaining the keyboard container dimension, the mouse click point is scaled to the prefixed keyboard container dimension(block 124).

From the forgoing, it is apparent that the present invention provides an improved method for performing a key mapping search. Ordering the keys based on frequency of occurrence increases the probability of finding an early match. Further, the confidence intervals or bounds enable this CPU 12 to break out of the key mapping search once a match is found. Thus, the need to calculate distance to all key points and then find the minimum distance is avoided. Moreover, the bound check criteria described is simpler than calculating the distance between two points which involves squaring.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a computer system having a memory, a method for mapping keys of a virtual keyboard displayed on a computer display to an input point generated by a pointing device comprising:
   a) storing key coordinates corresponding to the keys on said virtual keyboard in a key coordinate array in said memory;
   b) comparing the coordinates of said input point to the key coordinates stored in said key coordinate array in a predetermined sequence until a matching key is found or the end of the key coordinate array is reached;
   c) for each given key coordinate, determining whether the coordinates of said input point satisfy a predetermined bounding criteria; and
   d) if said bounding criteria is satisfied, assigning the corresponding key to said input point.

2. The key mapping method of claim 1 further including the step of ordering at least some of the key coordinates in said key coordinate array based upon frequency of occurrence of the corresponding keys.

3. The key mapping method according to claim 1 wherein said keyboard is displayed in a scalable keyboard container and further including the step of resizing said keyboard container.

4. The key mapping method according to claim 3 further including step of scaling the input point to a prefixed keyboard container dimension before comparing the input point to said key coordinates.

5. In a computer system having a memory, a method for mapping keys of a virtual keyboard displayed on a computer display to an input point generated by a pointing device comprising:
   a) storing key coordinates corresponding to keys on said virtual keyboard in a key coordinate array in said memory;
   b) ordering at least some of the key coordinates in said key coordinate array based on the frequency of occurrence of the corresponding keys;
   c) determining the coordinates of said input point;
   d) comparing the coordinates of said input point to the key coordinates stored in said key coordinate array in a predetermined sequence until a matching key is found or the end of the key coordinate array is reached;
   e) for each given key coordinate, determining whether the coordinates of said user input point satisfy a predetermined bounding criteria; and
   f) if said bounding criteria is satisfied, assigning the corresponding key to said user input.

6. The key mapping method according to claim 5 wherein said keyboard is displayed in a scalable keyboard container and further including the step of resizing said keyboard container.

7. The key mapping method according to claim 6 further including step of scaling the input point to a prefixed keyboard container dimension before comparing the input point to said key coordinates.

8. An input system for a computer comprising:
   a) a display for displaying a keyboard image comprising a plurality of keys;
   b) a pointing device for generating input points having coordinates referenced to the image displayed on said display;
   c) a memory for storing key coordinates corresponding to the keys in said keyboard image; and
   d) a logic device for:
      i) comparing the coordinates of said input point to the key coordinates stored in said memory in a predetermined sequence until a matching key is found;
      ii) for each key coordinate, determining whether said input point satisfies a predetermined bounding criteria;
      iii) if said bounding criteria is satisfied, assigning the corresponding key to said input point.

9. The input system of claim 8 wherein said keyboard image is displayed on said display in a scalable keyboard container.

10. The input system of claim 9 further including means for scaling said input points to a prefixed keyboard container dimension.

11. An input system for a computer comprising:
   a) a display for displaying a keyboard image comprising a plurality of keys;
   b) a pointing device for generating input points within said keyboard image;
   c) a memory for storing key coordinates corresponding to the keys in said keyboard image; and
   d) bound check means for sequentially comparing the coordinates of said input point to said key coordinates stored in memory and applying a predetermined bounding criteria to determine whether the key corresponding to said key coordinate is the selected key, until a matching key is found.

12. The input system of claim 11 wherein said keyboard image is displayed on said display in a scalable keyboard container.

13. The input system of claim 12 further including means for scaling said input points to a prefixed keyboard container dimension.

* * * * *